Patented Sept. 12, 1939

2,172,568

UNITED STATES PATENT OFFICE 2,172,568

PROCESS OF PREPARING ALKYL HALIDES

Friedrich Rothweiler, Hofheim in Taunus, Germany, assignor to I. G. Farbenindustrie Aktiengesellschaft, Frankfort-on-the-Main, Germany No Drawing. Application August 2, 1935, Serial No. 34,454. In Germany August 10, 1934

9 Claims. (Cl. 260—652)

The present invention relates to a process of preparing alkyl halides.

I have found that aliphatic alcohols together with hydrocarbons containing at least two halogen atoms can be transformed into the corresponding alkyl halides by causing the vaporous mixture of the two components to pass at a raised temperature over substances having an active surface.

As aliphatic alcohols there may, for instance, be used methyl alcohol, ethyl alcohol, primary and secondary propyl alcohol, n-butyl alcohol and others. As halogenated hydrocarbons there are, for instance, suitable all the aliphatic hydrocarbons containing at least two halogen atoms, such as chloroform, carbon tetrachloride, symmetrical dichloroethane, symmetrical tetrachloroethane, 1,1,2-trichloroethane, pentachloroethane; furthermre symmetrical tetrabromoethane, dichlorodibromoethane as well as fluorinated products. During the reaction tetrachloroethane is converted into trichloro ethylene; dichloroethane is converted into vinyl chloride; pentachloroethane is converted into tetrachloroethylene.

As reaction temperatures there may be applied temperatures of about 200° C. to about 350° C.

As substance having an active surface there may be used for instance activated carbon, silica gel, or pumice stone any of which, for strengthening its action may be charged with activating substances, for instance zinc chloride, phosphorus compounds and others.

The following examples serve to illustrate the invention, but they are not intended to limit it thereto:

(1) A vaporous mixture of 119.5 grams of chloroform (1 mol) and 96 grams of methyl alcohol (3 mols) are passed at a temperature of 250° C. over activated carbon. The reaction occurs according to the equation:

$$CHCl_3 + 3CH_3OH = 3CH_3Cl + CO + 2H_2O$$

By a fractionated condensation of the reaction products there are obtained 36.8 grams of water, 141.5 grams of methyl chloride (=93.4 per cent of the theory) and carbon monoxide as waste gas.

(2) A vaporous mixture of 119.5 grams of chloroform (1 mol) and 138 grams of ethyl alcohol (3 mols) behaves in the same manner as described in example 1, when caused to pass at a temperature of 250° C. over activated carbon.

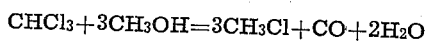

By a fractionated condensation there are obtained 34 grams of water, 168 grams of ethyl chloride (=86.7 per cent. of the theory) and CO as waste gas.

(3) By using 154 grams of carbon tetrachloride (1 mol) and 128 grams of methyl alcohol (4 mols) the following reaction occurs when the mixture in the form of vapor is caused to pass at a temperature of 250° C. over activated carbon:

$$CCl_4 + 4CH_3OH = 4CH_3Cl + 2H_2O + CO_2$$

By a fractionated condensation there are obtained 35 grams of the reaction water, 182 grams of methyl chloride (=90.2 per cent. of the theory) and $CO_2$ as waste gas.

(4) A vaporous mixture of 154 grams of carbon tetrachloride (1 mol) and 184 grams of ethyl alcohol (4 mols) undergoes reaction when passed at a temperature of 250° C. over activated carbon according to the equation:

$$CCl_4 + 4CH_3CH_2OH = 4CH_3CH_2Cl + 2H_2O + CO_2$$

By a fractionated condensation there are obtained 34 grams of water, 230 grams of ethyl chloride (=89 per cent. of the theory) and $CO_2$ as waste gas.

I claim:

1. The process which comprises conducting a gaseous mixture containing chloroform and methyl alcohol in the proportion of 1 mol to 3 mol over activated carbon at a temperature of about 250° C.

2. The process which comprises conducting a gaseous mixture containing chloroform and ethyl alcohol in the proportion of 1 mol to 3 mol over activated carbon at a temperature of about 250° C.

3. The process which comprises conducting a gaseous mixture containing carbon tetrachloride and ethyl alcohol in the proportion of 1 mol to 4 mol over activated carbon at a temperature of about 250° C.

4. The process which comprises conducting in a gaseous state lower aliphatic alcohols together with saturated aliphatic hydrocarbons substituted by at least three halogen atoms over substances having an active surface at temperatures between about 200° C. and about 350° C.

5. The process which comprises conducting in a gaseous state lower aliphatic alcohols together with saturated aliphatic hydrocarbons containing one carbon atom and substituted by at least three halogen atoms over substances having an active surface at temperatures between about 200° C. and about 350° C.

6. Process as defined in claim 4 in which the halogen atoms are chlorine atoms.

7. Process as defined in claim 4 in which the substance having an active surface is activated carbon.

8. Process as defined in claim 4 in which the halogen atoms are chlorine atoms and the substance having an active surface is activated carbon.

9. Process as defined in claim 5 in which the halogen atoms are chlorine atoms and the substance having an active surface is activated carbon.

FRIEDRICH ROTHWEILER.